United States Patent [19]

Faulkner

[11] 4,005,286
[45] Jan. 25, 1977

[54] COMPACT ILLUMINATION SYSTEM WITH LIGHT ABSORBING AND REFLECTING WALLS

[75] Inventor: Hubert D. Faulkner, Irving, Tex.

[73] Assignee: Recognition Equipment Incorporated, Dallas, Tex.

[22] Filed: Aug. 11, 1976

[21] Appl. No.: 713,329

Related U.S. Application Data

[63] Continuation of Ser. No. 554,659, March 3, 1975, abandoned.

[52] U.S. Cl. .............................. 250/216; 250/566; 250/239
[51] Int. Cl.² ...................... H01J 3/14; H01J 5/16; H01J 39/12
[58] Field of Search .......... 250/566, 568, 239, 216, 250/570, 567

[56] References Cited

UNITED STATES PATENTS

| | | | |
|---|---|---|---|
| 2,957,085 | 10/1960 | Faulhaber | 250/239 X |
| 3,359,425 | 12/1967 | Smith | 250/239 X |
| 3,561,846 | 2/1971 | Kingsland | 250/239 X |
| 3,581,100 | 5/1971 | Milford | 250/568 X |
| 3,673,416 | 6/1972 | Berler | 250/239 X |
| 3,784,794 | 1/1974 | Allais | 250/566 X |

Primary Examiner—Alfred E. Smith
Assistant Examiner—David K. Moore
Attorney, Agent, or Firm—John E. Vandigriff

[57] ABSTRACT

A method and system for uniformly illuminating a field of information is provided for optical readers having a scanning device loosely constrained in movement. Lamps are symmetrically located about the optical axis of a sensor and enclosed within a four-sided illuminator. The sides of the illuminator converge at one end to a port having dimensions defined by the field to be viewed. A plate between the lamps and the sensor partially closes the second end of the illuminator, with an aperture therein symmetrical to the optical axis of the sensor. Internal wall portions of the illuminator adjacent to the reflecting plate are of a high diffuse reflectance, while portions adjacent to the port are of a low diffuse reflectance.

11 Claims, 7 Drawing Figures

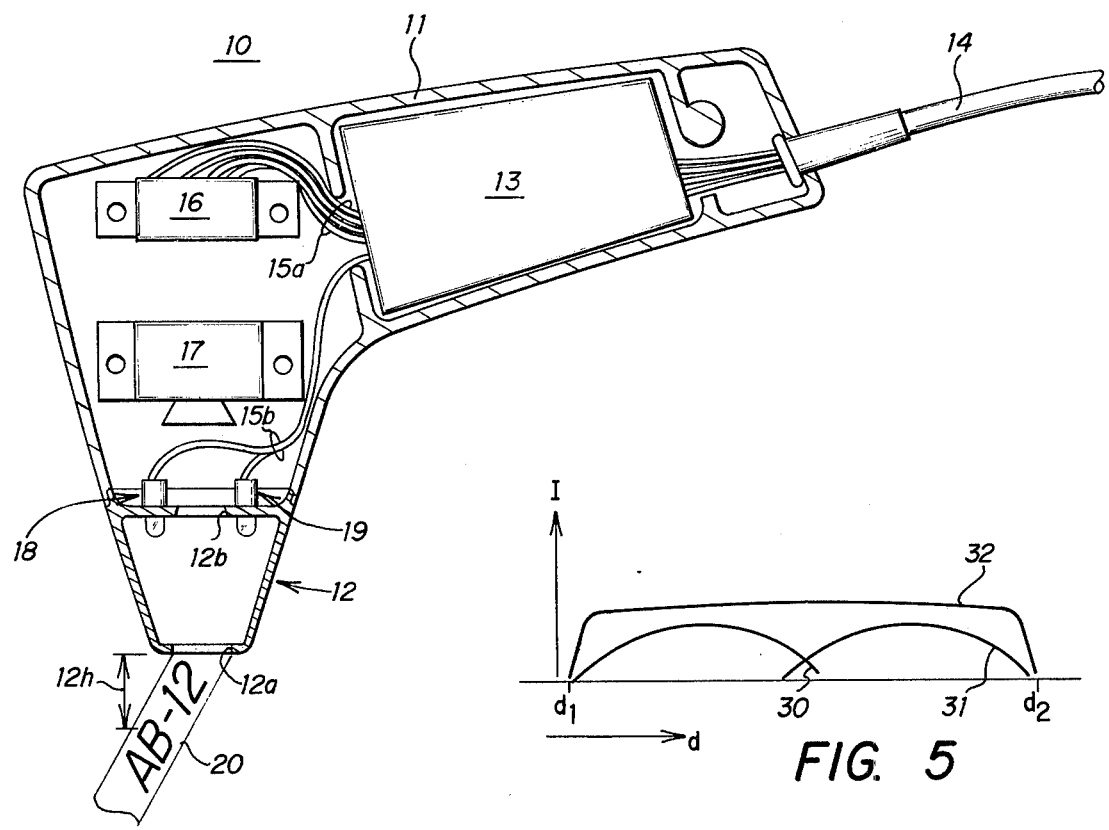
FIG. 1
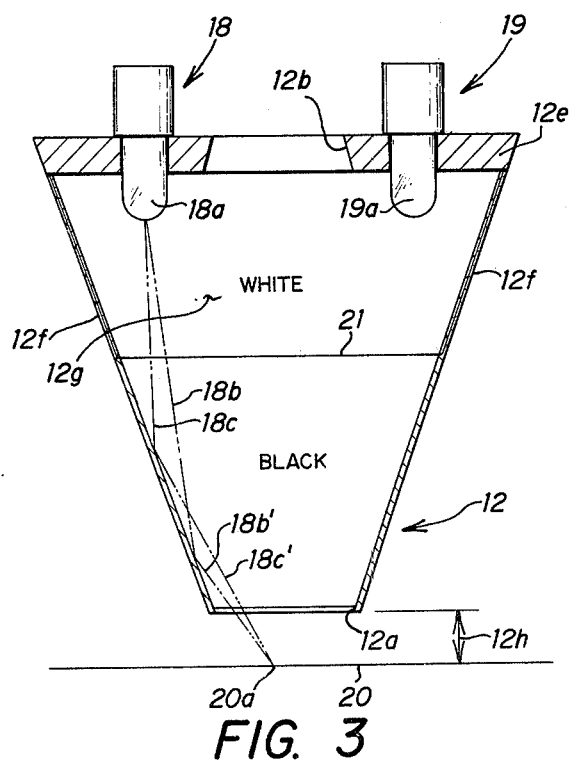
FIG. 5
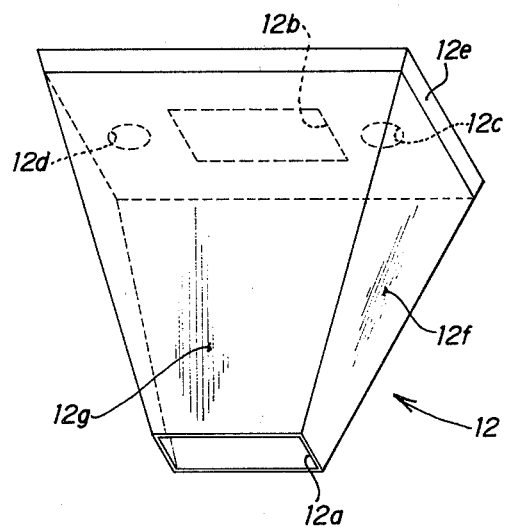
FIG. 2
FIG. 3

U.S. Patent  Jan. 25, 1977  Sheet 2 of 2  4,005,286
FIG. 4
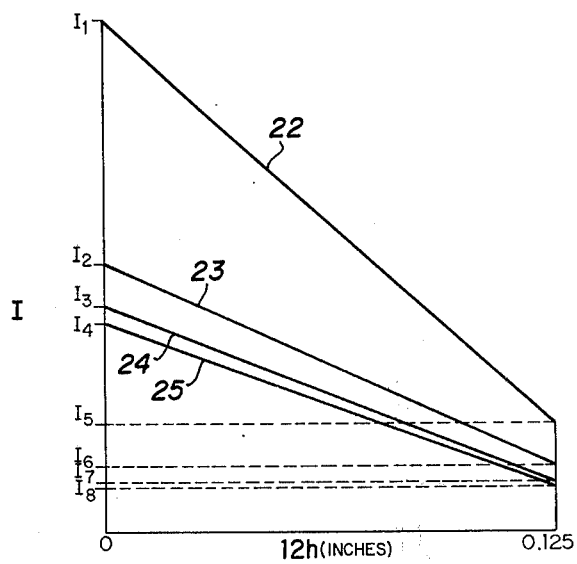
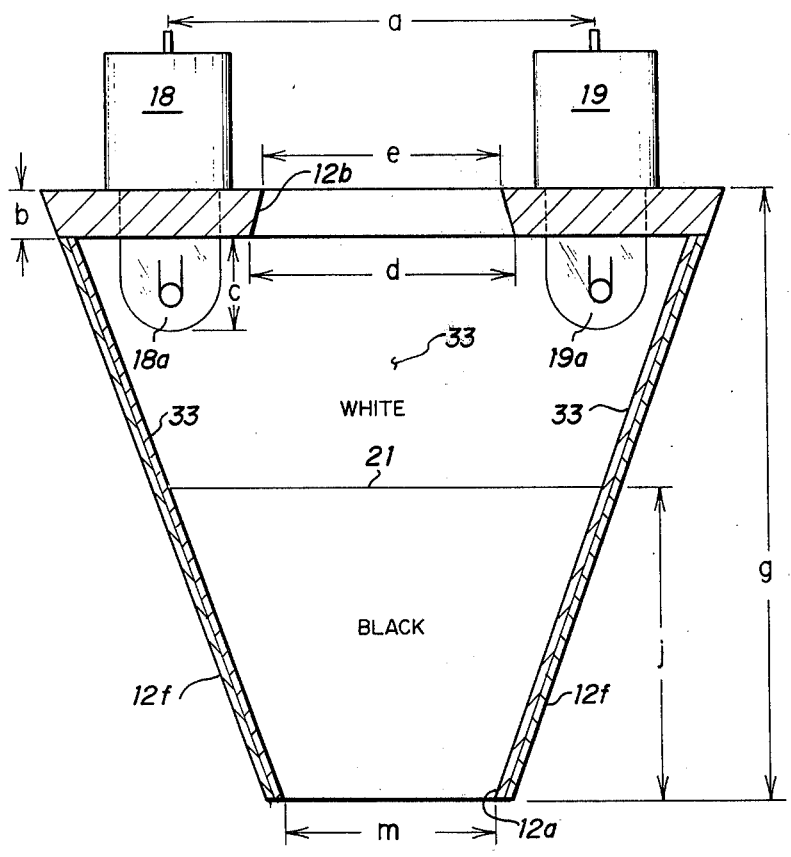
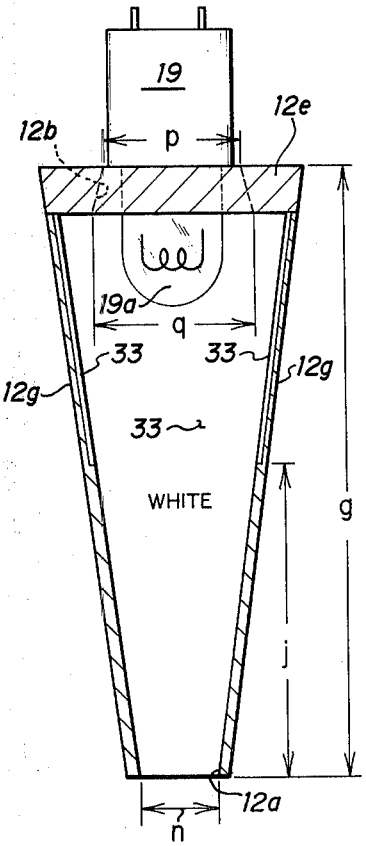
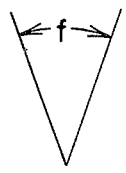
FIG. 6
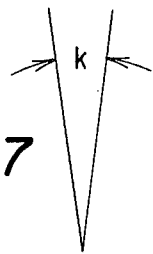
FIG. 7

COMPACT ILLUMINATION SYSTEM WITH LIGHT ABSORBING AND REFLECTING WALLS

This is a continuation of application Ser. No. 554,659, filed Mar. 3, 1975 and now abandoned.

FIELD OF THE INVENTION

This invention relates generally to a method and system for uniform illumination of data fields passing in registration with optical character recognition systems. In a specific aspect, the invention relates to an illumination system embodied within a hand-held scanning device loosely constrained in movement.

DESCRIPTION OF THE PRIOR ART

Systems for automatically reading alphanumeric data fields have been developed for various uses. In some systems, registration between the scanning system and a document may be controlled to minimize reading problems. In merchandising operations, however, a hand-held wand is used to scan data fields on merchandise or tags. Because of the variations in the relative movement between the scan unit and the data field, misregistrations occur which cause corresponding errors in character identification. A further cause of such reading errors is the nonuniform illumination resulting from data field skew, yaw, tilt and depth of field variations relative to the scanning device.

To alleviate such illumination problems, a conventional approach has been to alter the optical design, enclose the optical system within a reflector case, or increase the light intensity and number of lamps within the scan head. Such alternative designs have resulted in complex and bulky optical systems, heating of the scan head and subsequent discomfort to the user, and increased power consumption. Where mirror-type reflectors have been used, the illumination problem has been aggravated by the occurrence of hot spots and shadows in the data field caused by deformities in the reflector surface.

The present invention provides a system and method wherein the illumination of a data field is made more uniform while the deleterious effects inherent in the prior art systems are substantially reduced or eliminated.

SUMMARY OF THE INVENTION

An illumination method and system is provided for hand-held and other types of scanning devices used with optical character recognition systems and operated in a loosely constrained environment. An illuminator enclosure employs a light source symmetrical to the optical axis of a sensor. Walls of the illuminator converge to define a port to be passed in registration with a data field. A first area of the inner walls of the illuminator is of high diffuse reflectance, while a second area adjacent to the port is of low diffuse reflectance. Thus, light emanating from the light source is dispersed within the illuminator.

A plate located between the light source and the sensor partially closes the end opposite the port, with an aperture in the plate symmetrical to the optical axis of the sensor preferably tapered to direct primary light away from the sensor.

In a preferred embodiment, a compact illumination system is provided for a scanning device restricted both in size and power requirements.

DESCRIPTION OF THE DRAWINGS

For a more complete understanding of the present invention and for further objects and advantages thereof, reference is now made to the following description taken in conjunction with the accompanying drawings, in which:

FIG. 1 is a side view of a hand-held scanning device embodying the invention and having an outer cover cut away to expose internal component parts;

FIG. 2 is a perspective view of an illuminator in accordance with the invention and used in the system of FIG. 1;

FIG. 3 is a sectional side view of the illuminator of FIG. 2 with lamps seated in place;

FIG. 4 is a graph of illumination intensity (I) versus depth of data field (DOF) to be viewed for several combinations of high and low diffuse reflectance areas comprising the inner surfaces of the illuminator of FIG. 2;

FIG. 5 is a diagram of illumination intensity over a field of view illuminated by the illuminator of FIG. 2;

FIG. 6 is a sectional side view of a preferred embodiment of the present invention; and FIG. 7 is a sectional side view of the preferred embodiment of FIG. 6 taken in a direction normal to that illustrated in FIG. 6.

DESCRIPTION OF PREFERRED EMBODIMENTS

A hand-held scan head or wand 10, as illustrated in FIG. 1, includes an outer housing 11 and a detachable illuminator 12. Housing 11 provides chambers for a video processing unit 13 in electrical communication with external data processing and character recognition units by way of cable 14. A two-dimensional photosensor array 16 in housing 11 is repeatedly and automatically scanned by unit 13 through conductors 15a. A lens system 17 is positioned ahead of array 16. Lens system 17 gathers light reflected by a data field through illuminator 12 and focuses such light upon the surface of the sensor array 16. Lamps 18 and 19 are energized by conductors 15b of cable 14 and are seated within apertures formed in the upper end of illuminator 12. The filaments of the lamps extend into the interior of the illuminator.

In merchandising operations, wand 10 is passed in registration with a data field or merchandise tag 20. The light generated by lamps 18 and 19 is dispersed by the reflecting inner walls of illuminator 12 so as to illuminate tag 20. Light reflected by the data field 20 then passes through port 12a and an aperture 12b of illuminator 12, and is gathered by lens system 17 and focused upon sensor array 16.

It will be recognized that the sweep of wand 10 across the data field 20 may not be at a uniform velocity and may follow a nonlinear path which is not parallel with the plane of the tag. Further, the port 12a may be skewed during all or part of its travel across the data field. The distance 12h may vary from zero but preferably will remain close to zero. The necessarily loose constraints upon use causes undesirable errors in data recognition which are further compounded by variances in illumination over the field of view.

The present invention provides an illuminator which redirects the light produced from sources within wand 10 so as to provide not only uniform two-dimensional illumination to accommodate large tolerance in skew, yaw and tilt, but also to accommodate large tolerances in depth of field (DOF) as the operator varies the distance 12h between a merchandising tag and the wand port 12a. Such depth of field variations may occur simply because data fields may be placed on irregularly shaped merchandise.

As better seen in FIGS. 2 and 3, illuminator 12 is a four-sided enclosure having side walls 12f and 12g which converge to a port 12a at one end, and diverge to a larger closure plate 12e in the opposite end. A central rectangular aperture 12b is formed in plate 12e. Circular apertures 12c and 12d are symmetrically placed at the ends of aperture 12b. It is to be understood that while aperture 12b is shown as rectangular in FIGS. 2 and 3, other configurations including a circular shape also may be used.

The walls of plate 12e defining aperture 12b are tapered to diverge into illuminator 12 at an angle relative to the filaments in bulbs 18 and 19 to reflect light from lamps 18 and 19 back into the interior of the illuminator. Primary light is prevented thereby from interfering with the two-dimensional image reflected by a data field through aperture 12b.

In assembled form, illustrated in FIG. 3, lamps 18 and 19 are seated within apertures 12d and 12c, respectively, with filaments 18a and 19a positioned within the interior of the illuminator chamber. Emanating from lamp 18 are rays of light, 18b and 18c, which strike an inner wall of side 12f below a boundary generally indicated by a line 21, and are reflected toward port 12a. When the illuminator 12 is displaced a distance 12h from data field 20, the rays converge to form highly illuminated areas 20a on the data field. In addition, the law of inverse squares operates upon the reflected rays 18b' and 18c' to cause a rapid fall-off in illumination at the edges of port 12a as the distance between the port and data field 20 increases.

To substantially eliminate such illumination aberrations, an area of the inner surface of side walls 12f and 12g above line 21 is coated with or formed from a high diffuse reflectance material to disperse light within illuminator 12. The lower surface of plate 12e also is coated with or formed from the high diffuse reflectance material to provide a back reflectance to filaments 18a and 19a.

In contrast, the inner surfaces of side walls 12f and 12g below line 21 are painted with or formed from a low diffuse reflectance material that is nonreflecting, light absorbent. The nonreflecting inner wall area substantially eliminates the occurrence of hot spots or highly illuminated areas in data fields to be viewed, and serves to minimize the fall-off in illumination which occurs at the edges of port 12a with increased distance from the data field. More particularly, the low diffuse reflectance of the nonreflecting inner area of illuminator 12 absorbs to a large degree the direct rays of light from lamps 18 and 19, and thus moderates the square law effect which operates upon the reflections of such direct rays.

In fabricating illuminator 12, the dimensions of the illuminator are determined first from the size of the data field to be illuminated. With the length and width of port 12a chosen so as to illuminate a particular data field area, the angle of convergence of side walls 12f and side walls 12g, the distance between lamps 18 and 19, and the taper of the plate 12e walls enclosing aperture 12b are established to provide uniform illumination of the data field. A further variable is the distance by which filaments 18a and 19a extend into the interior of the illuminator 12. Such distance influences the angle of convergence of side walls 12f and 12g. In addition, the location of boundary line 21 is varied as a compromise between maximum illumination and minimum fall-off with depth of field. For example, as the distance between boundary 21 and aperture 12a is decreased, the overall intensity level impinging upon the data field is increased at the sacrifice of uniformity of illumination as evidenced by the fall-off at the edges of the field of view. When the nonreflective area between boundary line 21 and aperture 12a is increased in height, there is a consequent improvement in the uniformity of illumination; however, the overall intensity level of the light impinging upon the data field is decreased. Thus, it is seen that the dimensions of illuminator 12 may be tailored to uniformly illuminate a data field of a particular size.

FIG. 4 illustrates the fall-off in light intensity on a field of data as the distance between port 12a and the data field is increased. 100% intensity ($I_1$) is that obtained at a zero depth of field for an illuminator having internal surfaces entirely of high diffuse reflectance material. In this context, depth of field refers to the distance 12h between port 12a and a field of data to be viewed.

Each of the graphs illustrated in FIG. 4 was obtained with an embodiment of the invention used in combination with an 18 × 42 array of silicon photosensors. The maximum of the responses generated by the sensors was found when 12h = 0. The lowest was found when 12h = 0.125 inches.

With illuminator 12 having inner surfaces entirely comprised of high diffuse reflectance material, graph 22 depicts approximately a 52% fall-off in illumination intensity between a 100% intensity ($I_1$) at 12h = 0 and a 48% intensity ($I_5$) at 12h = 0.125 inches. The remaining graphs, 23–25, represent the illumination intensity for 12h varying between 0.00 and 0.125 inches wherein illuminator 12 comprises inner surface portions of low diffuse reflectance material adjacent port 12a.

More particularly, when the boundary between high and low diffuse reflectance portions as represented by line 21 of FIG. 3 is located 0.250 inches from port 12a, an intensity fall-off of approximately 38% occurs between a 68% intensity ($I_2$) and a 42% intensity ($I_6$) as illustrated by graph 23. As line 21 is displaced further from port 12a, the maximum illumination intensity decreases as does the fall-off of intensity. Accordingly, when the inner low diffuse reflectance surface of illuminator 12 is of a height of about 0.375 inches adjacent port 12a, a fall-off of approximately 37% occurs between a 63% intensity ($I_3$) and a 40% intensity ($I_7$) as illustrated by graph 24. Further, as illustrated by graph 25, when the low diffuse reflectance material is of a height of about 0.500 inches, a fall-off of approximately 35% occurs between a 60% intensity ($I_4$) and a 39% intensity ($I_8$).

Referring to FIG. 5, there is illustrated the illumination pattern of lamps 18 and 19 with and without the present invention. Curves 30 and 31 illustrate the intensity patterns of lamps 18 and 19 over a data field area having a width of $d_2 - d_1$. The composite intensity pattern has a nonuniform cross section and has a significant fall-off at the edges of the field of view. When the lamps are placed within a housing such as that of illuminator 12, however, a more uniform intensity pattern results as illustrated by curve 32. In addition, there is an accompanying reduction in fall-off at the edges of the field of view near ordinates $d_2$ and $d_1$.

In a preferred embodiment as illustrated in FIGS. 6 and 7, a side wall insert 33 and plate 12e, are molded of a white plastic produced by Union Carbide and represented to the public as Polysulfone, P-1700 White 7404. The insert is emplaced within side walls 12f and 12g to form an inner area of high diffuse reflectance material, which may withstand the high temperatures generated by the lamps and which has a spectral response coincident with that of silicon photosensors.

Interposed between the high diffuse reflectance insert and port 12a is an inner surface portion of low diffuse reflectance material. In the preferred embodiment described herein, a black paint produced by Eastman and generally represented to the public as Kodakoat is used to produce a flat, nonreflective black coating.

Though particular coatings and molds have been described, it is to be understood that such coatings and molds may be substituted by others having light responses within the spectral response of the photosensor array 16 of FIG. 1. In the preferred embodiment, silicon photosensors were chosen and the spectral requirements for the molded insert and the interior coatings accordingly were defined to correspond with that of the sensors.

As nonuniform illumination also may occur from the use of lamps having bulbs which tend to focus rather than fully disperse the light, lamps such as those produced by Chicago Miniature of Chicago, Ill., and represented to the public as CM7–7628 lamps, were used in the preferred embodiment to insure against such a lens effect. For a 0.425-inch × 0.17-inch data field, the preferred embodiment as illustrated in FIGS. 6 and 7 employs the combination of the angles of convergence of walls 12f and 12g, the distance between lamps 18 and 19, the relative sizes of the high and low diffuse reflectance areas on the inner surfaces of walls 12f and 12g, and the distance by which filaments 18a and 19a extend within the interior of illuminator 12.

For uniformity of illumination in the order of ± 5 to 10% from average and a less than 30% fall-off in illumination at the edges of a data field area one-eighth of an inch distant from aperture 12a, lamps 18 and 19 are spaced apart a distance (a) of about 0.7 inches and energized at 6 volts by way of cable 14. Lamps 18 and 19 are seated in plate 12e so that filaments 18a and 19a extend transversely of the length of plate 12e. With a plate thickness (b) of about 0.062 inches, lamps 18 and 19 extend into the interior of illuminator 12 a distance (c) of about 0.128 inches.

The taper of aperture 12b is formed with distance (d) equal to about 0.42 inches between the inner illuminator edges and with a distance (e) equal to about 0.38 inches between the outer edges along the longitudinal axis of the aperture. The distance (e) is determined by the optical geometry of the illumination system, i.e., wide enough to admit the two-dimensional image reflected by the data field to be viewed. The distance (d) then is employed to form the taper of aperture 12b so as to prevent interference from the primary light of lamps 18 and 19. Such interference is suppressed further by application of the non-reflective black coating to the walls of plate 12e defining aperture 12b.

The angle (f) of convergence between side walls 12f is about 40°, while the vertical length (g) from the outer surface of plate 12e to the aperture 12a is approximately 0.975 inches. With the dimensions of the illuminator 12 so established, the boundary line 21 between the nonreflective and reflective inner surfaces of illuminator 12 is formed at a distance (j) of between about 0.250 inches and 0.5 inches from aperture 12a. The aperture 12a is of length (m) of about 0.42 inches to illuminate a data field of length of 0.31 inches as viewed by the sensor array.

The size of the data field image seen by the sensor array is determined primarily by the optical geometry of the illumination system, and not solely by the size of aperture 12b. When the data field viewed by the sensor array is of a size smaller than that viewed through port 12a, the incidence of interference caused by primary light reflections through aperture 12b is substantially reduced.

A second side view normal to that of FIG. 6 is shown in FIG. 7, where the angle of convergence (k) between side walls 12g is about 15° and the width (n) of aperture 12a is about 0.17 inches to illuminate a data field of width of 0.096 inches as viewed by the sensor array. The taper of aperture 12b is formed with a distance (p) equal to about 0.220 inches between the outer illuminator edges, and with a distance (q) equal to about 0.260 inches between the inner edges.

It has been found that with an illuminator constructed as illustrated in FIGS. 6 and 7, the inner surfaces of side walls 12f transverse to plate 12e could be entirely of the high diffuse reflectance material with only a minor change in the uniformity and fall-off characteristics of the illumination intensity, illustrated by curve 32 of FIG. 5. A more dramatic response in illumination intensity, however, was observed when the height of the low diffuse reflectance area of the larger side walls 12g along the longitudinal axis of plate 12e was varied.

In accordance with the invention, there is provided an optical character reader illuminator which disperses light emanating from a light source so as to uniformly illuminate a data field area being scanned, and which substantially reduces illumination variations caused by loosely constrained movement of the scan head relative to the data field.

Having described the invention in connection with certain specific embodiments thereof, it is to be understood that further modifications may now suggest themselves to those skilled in the art and it is intended to cover such modifications as fall within the scope of the appended claims.

What is claimed is:

1. A data field illuminator for uniformly brightening a data field viewed by a photo sensor array in an optical character recognition system comprising; an enclosure having side walls converging from an enclosure plate to a first aperture, said enclosure plate enclosing one end of said enclosure and having a second aperture therein for the passage of light to said photo sensor array reflected from a data field in registration with said first aperture, a light absorbing inner surface on two of said side walls extending from the first aperture toward the closure plate to a boundary line located intermediate the first aperture in said closure plate, and a light reflecting surface extending from the boundary line to said closure plate, a light reflecting surface on two other of said side walls and a light source supported by said closure plate for illumination of the data field.

2. The combination set forth in claim 1 wherein said light absorbing inner surface encompass said first aperture.

3. The combination set forth in claim 1 wherein said light reflecting inner surfaces are of a high diffuse reflectance material coating applied to said walls.

4. The combination set forth in claim 3 wherein said light absorbing inner surfaces are of a low diffuse reflectance material coating applied to said walls.

5. The combination set forth in claim 1 wherein said enclosure has four walls oriented at two different slopes, and wherein said first aperture is rectangular in shape.

6. The combination as set forth in claim 5 wherein said enclosure is rectangular in shape and wherein the light absorbing inner surface is a low diffuse reflectance material and the light reflecting surface is a high diffuse reflectance material.

7. The combination set forth in claim 1 wherein said light source includes two lamps seated within third and fourth apertures in said closure plate with the filaments of said two lamps in the interior of said enclosure.

8. The combination set forth in claim 1 wherein said light reflecting inner surface is formed from a high diffuse reflectance material, and said light absorbing inner surface is formed from a low diffuse reflectance material.

9. An illuminator for uniformly brightening a data field viewed by a photosensor array, which comprises:
four quadrilateral walls symmetrical to the optical axis of said array and joined so as to form a small first aperture remote from said array and diverging to an open end intermediate to said array and said first aperture, with the internal surface of each of said walls having a high diffuse reflectance area extending from the open end toward said first aperture and the internal surface of at least two of said walls having a low diffuse reflectance area extending from the first aperture to the high diffuse reflectance area;
A reflecting plate enclosing the open end and joined to said four walls, said plate having a second aperture aligned with said first aperture; and
a plurality of lamps supported in said plate symmetrical to said second aperture, and directed away from said array and toward said first aperture.

10. The combination set forth in claim 9 wherein said high diffuse reflectance area is adjacent said reflecting plate, and said low diffuse reflectance area is adjacent said first aperture.

11. The combination set forth in claim 9 wherein said first and second apertures are elongate rectangles, and said lamps are located adjacent opposite ends of said second aperture.

* * * * *